United States Patent [19]
Adam et al.

[11] Patent Number: 6,068,931
[45] Date of Patent: May 30, 2000

[54] SELF-LUBRICATING BEARING MATERIAL AND PLAIN BEARING OF SUCH A BEARING MATERIAL

[75] Inventors: Achim Adam, Nauheim; Karl-Heinz Grünthaler, Usingen; Erich Hodes, Rosbach, all of Germany

[73] Assignee: Federal-Mogul Wiesbaden GmbH, Wiesbaden, Germany

[21] Appl. No.: 08/913,353

[22] PCT Filed: Feb. 14, 1996

[86] PCT No.: PCT/DE96/00244

§ 371 Date: Aug. 25, 1997

§ 102(e) Date: Aug. 25, 1997

[87] PCT Pub. No.: WO96/26975

PCT Pub. Date: Sep. 6, 1996

[30] Foreign Application Priority Data

Feb. 25, 1995 [DE] Germany .................. 195 06 684

[51] Int. Cl.[7] .................. B32B 15/08; B32B 27/20; C10M 103/06; F16C 33/06

[52] U.S. Cl. .................. 428/469; 428/628; 428/632; 428/645; 428/457; 428/674; 428/422; 428/697; 106/287.19; 384/300; 252/12.2

[58] Field of Search .................. 428/615, 628, 428/618, 624, 626, 632, 674, 263, 307.3, 457, 461, 458, 469, 472, 689, 702, 908.8, 421, 422, 613, 645, 657, 463; 384/276, 279, 300; 106/287.19, 287.27, 287.28, 823, 432; 252/12, 25, 12.2; 508/181; 501/40

[56] References Cited

U.S. PATENT DOCUMENTS

| | | | |
|---|---|---|---|
| 4,626,365 | 12/1986 | Mori | 252/12 |
| 5,039,575 | 8/1991 | Mori et al. | 428/463 |
| 5,364,682 | 11/1994 | Tanaka et al. | 428/138 |
| 5,618,873 | 4/1997 | Tanaka et al. | 524/430 |
| 5,686,176 | 11/1997 | Adam et al. | 428/327 |

FOREIGN PATENT DOCUMENTS

| | | |
|---|---|---|
| 0 168 866 A1 | 6/1985 | European Pat. Off. . |
| 0 183 375 A2 | 6/1986 | European Pat. Off. . |
| 27 02 599 | 3/1982 | Germany . |
| 30 27 409 A1 | 4/1982 | Germany . |
| 21 04 605 | 12/1983 | Germany . |
| 20 52 513 | 5/1984 | Germany . |
| 35 20 068 A1 | 12/1985 | Germany . |
| 32 21 785 C2 | 10/1986 | Germany . |
| 37 36 292 A1 | 5/1989 | Germany . |
| 57-102949 | 6/1982 | Japan . |
| 1 548 045 | 7/1979 | United Kingdom . |
| 2 161 820 | 1/1986 | United Kingdom . |
| 2 220 713 | 1/1990 | United Kingdom . |
| 2 279 998 | 1/1995 | United Kingdom . |

OTHER PUBLICATIONS

Chemical Abstracts, vol. 97, No. 24, Dec. 13, 1982.
Database WPI, Derwent 87–002645, Nov. 19, 1986.
Chemical Abstracts, vol. 86, No. 20, May 16, 1997.

*Primary Examiner*—Deborah Jones
*Assistant Examiner*—Michael LaVilla
*Attorney, Agent, or Firm*—Herbert Dubno

[57] ABSTRACT

A self-lubricating bearing material is described, as well as a plain bearing of such a bearing material, the performance of which, under lubricant-free conditions, is so markedly improved that pv values of up to 6 MPa/m/s are achieved in an average load and speed range. The self-lubricating bearing material comprises a PTFE-containing polymer matrix with fillers comprising PbO and at least one metal fluoride. The PbO content is from 15–55 vol. % and the metal fluoride content is from 0.1–14 vol. %. Preferred metal fluorides are $CaF_2$, $PbF_2$ and $MgF_2$. The addition of further fillers such as hard materials, pigments or fibrous material is possible. The proportion of further additives may amount to up to 40 vol. % of the PbO/metal fluoride fillers.

16 Claims, 3 Drawing Sheets

SELF-LUBRICATING BEARING MATERIAL AND PLAIN BEARING OF SUCH A BEARING MATERIAL

CROSS REFERENCE TO RELATED APPLICATIONS

This application is a national stage of PCT/DE96/00244 filed Feb. 14, 1996 and based, in turn, on German national application 195 06 684.7 of Feb. 25, 1995 under the International Convention.

FIELD OF THE INVENTION

The invention relates to a self-lubricating bearing material of a PTFE-containing polymer matrix with fillers comprising PbO and metal fluorides, as well as to a plain bearing of such a bearing material.

BACKGROUND OF THE INVENTION

Bearing materials with plastic-based overlays are known as single-layer, two-layer or three-layer composite materials: solid plastic bearings, bearings with an outer metallic backing and directly applied or adhered plastics, bearings with inner wire meshes, as well as three-layer bearings of backing metal, a sintered porous metal layer and a covering layer formed in the pores. All these bearings are generally used in fields in which the use of externally supplied lubricants is impossible or undesirable. When in operation, therefore, they must intrinsically provide the lubricants.

Multilayer materials differ from solid plastic materials, for example by a negligible tendency towards cold flow under load, by substantially better heat conductivity and, in connection therewith, by notably higher possible pv values. The solid plastic materials may, however, be advantageous in certain cases, e.e. for reasons of cost. Among three-layer materials, it is possible to distinguish further between those with overlays based on fluorothermoplastics, such as PTFE, PFA, FEP etc., and other plastics such as PEEK. The latter two groups differ in their manner of operation: while, in the case of PTFE-based materials, the bronze intermediate layer is the "active" component of the overlay and acts like a filler, the other plastic materials use it only as an anchoring means. If there is sufficient affinity to the metal backing, they permit the production of true two-layer materials, but they may also be applied with the aid of an adhesive layer. On the active sliding surface the thermoset or thermoplastic material assumes the supporting role of the bronze. Moreover, bearing materials of filled fluorothermoplastic films adhered to metal or other supports with wire meshes incorporated in the plastic are known and may likewise be adhered to a metal backing.

Each variant has inherent advantages and disadvantages. However, the three-layer materials based on fluorothermoplastics, such as PTFE, are universally applicable and easy to produce and also exhibit the highest performance and temperature resistance. In the case of the latter, homogeneous mixtures are produced by means of a plastic dispersion and the final composite material is produced, after the production of a PTFE/filler paste, by a rolling process and subsequent sintering of the PTFE.

The most commonly used fillers for such materials are lead and molybdenum sulphide, which produce almost identical performance and which may be also used with lubrication. In many cases it would be desirable to solve structural problems by using maintenance-free, space-saving plain bearings with a PTFE overlay, but this must be rejected owing to the upper load limit thereof, which, within an average load and speed range (0.5–100 MPa and 0.02–2 m/s), lies at a pv value of approximately 2 MPa m/s.

A sliding material is known from DE 41 05 657 A1 which comprises a backing metal with a porous metal layer, in which definite pores are present, the pores and their surfaces being impregnated and coated with an impregnating coating composition. The impregnating coating composition consists of 0.5–30 vol.-% PFA, EPE or FEP, 5–30 vol.-% metallic lead with a specific surface of from 1000–8500 $cm^2/g$ in an average particle size, 0.5–30 vol.-% metal oxide, metal fluoride, graphite or the like, ceramics, such as SiC, and fibrous material, such as carbon fibers or glass fibers, the rest consisting of PTFE. The total of all components other than PTFE amounts to from 6–50 vol.-%.

DE 41 05 657 A1 mentions only a metal fluoride-containing impregnating material comprising 2% $PbF_2$ but no metal oxide, wherein said material is not distinguished from other exemplary embodiments comprising no metal fluoride by improved cavitation resistance or wear resistance.

EP 0 183 375 A2 describes a bearing especially for shock absorbers, whose overlay consists, for the purpose of improving the cavitation resistance, of PTFE with a fluoride of low water-solubility. The fluoride content, which may, inter alia, be $CaF_2$ or $MgF_2$, is stated as being from 1–50 vol.-%, preferably from 10–30 vol. %. 20 vol. % is cited as a preferred example. GB 912,793 describes standard bearing materials of PTFE with lead and/or lead oxide, wherein the filler content is from 16–44%, preferably from 16–30%.

The self-lubricating bearing known from DE 35 16 649 A1 comprises thinly rolled-out sheet- or scale-like particles in the PTFE matrix, which form smears which consist of a plurality of layers arranged spacedly one above the other and extending substantially parallel to the surface of the sintered metal layer. Metal oxides and metal fluorides, inter alia, are cited as solid lubricants, only lead and lead oxide being discussed as Examples.

OBJECT OF THE INVENTION

The object of the invention is to provide a self-lubricating bearing material as well as a plain bearing comprising such a self-lubricating bearing material, the performance of which is so markedly improved under lubricant-free conditions that pv values of up to 6 MPa m/s are reached in the average load and speed range.

SUMMARY OF THE INVENTION

This object is attained, in accordance with the invention by providing a self-lubricating bearing material of a PTFE-containing polymer matrix with fillers comprised of 15 to 55 volume percent PbO and at least one metal fluoride in an amount of 0.1 to 14 volume percent. The invention also relates to a plane bearing with a self-lubricating plastic overlay which contains this filler.

The invention is based on the recognition that performance under lubricant-free conditions may be markedly increased when a certain filler combination comprising PbO and metal fluoride is used in conjunction with PTFE. It is important to keep this filler combination of PbO and metal fluoride within a narrow range.

It has surprisingly emerged that, for PTFE-containing materials, a range of from 0.1–14 vol. % is particularly excellent in the case of metal fluorides, which was not previously known from the prior art. Although EP 0 18 33

75 mentions a metal fluoride content of from 1–50% and a relatively high content of 20% is described therein as particularly advantageous, this is obviously because in the known sliding material absolutely no PbO is present, such that the lack of this filler has to be compensated by a high metal fluoride content. The fact that a metal fluoride content of from 0.1–14 vol. % results in particularly advantageous properties is presumably the consequence of the interaction with lead oxide, which must at the same time be included in the sliding material in an amount ranging from 15–55 vol. %. Above 14 vol. % no further improvement can be achieved by increasing the metal fluoride content with respect to PbO. Although according to DE-OS 41 05 657 PbO and metal fluoride may be jointly present, the PbO and metal fluoride contents according to the invention have not always been recognized as particularly advantageous, because the improved properties of the sliding material described therein results substantially from the metallic lead additionally present and its particularly large specific surface of up to 8500 cm$^2$/g. It has been shown that, when the PbO and metal fluoride contents according to the invention are maintained, an additional lead content may be completely dispensed with.

In PTFE matrix materials a metal fluoride, especially calcium fluoride, content of 0.1–14 vol. % has proven especially advantageous. However, it was also possible to achieve marked improvements in the sliding materials within this range with $PbF_2$, $MgF_2$ or another fluorocompound of an element from the second main Group of the Periodic Table.

Even if the above-described advantageous mixtures of the filler combinations according to the invention and PTFE are integrated into other polymer matrices such as those, for example, of PEEK (polyetherether ketone), PPS (polyphenylene sulphone), PA (polyamide), PVDF (polyvinylidene fluoride), PSU (polysulphone), PES (polyether sulphone) or PEI (polyether imide), improved results are achieved in comparison to variants filled only with PTFE or with PTFE and PbO. However, the best results were achieved with PTFE in conjunction with the filler combinations according to the invention. If the polymer matrix consists of PTFE, within the range according to the invention of from 0.1–14 vol. % $CaF_2$ and 15–55 vol. % PbO the range of from 24–40 vol. % PbO and 0.3–8 vol. % $CaF_2$ is particularly advantageous.

The improved properties of the sliding material achieved with the filler combination according to the invention are retained or could be improved for specific applications by further additives, if the proportion of these further additives amounts at most to 40 vol. %, preferably to 20 vol. %, of the PbO/metal fluoride filler combination. Further additives may be those from one or more of the group comprising hard materials, pigments, fibrous materials, solid lubricants or thermoset or high temperature thermoplastics materials. Particularly suitable hard materials are $Si_3N_4$ and particularly suitable pigments are $Fe_2O_3$ or carbon black. Particularly suitable fibrous materials are short graphite fibers or aramid fibers. Preferred solid lubricants are $MoS_2$ and boron nitride. Polyamide imides or polyimides may be used as thermoset or high temperature-resistant thermoplastics materials.

A plain bearing with such an overlay may be constructed as a solid plastics bearing or with a metal backing. The overlay may be applied directly to a metal backing or a layer of porous sintered bronze may be provided on the metal backing, on which the overlay is then applied.

The three-layer materials may, for example, be constructed in such a way that a 0.15–0.5 mm thick layer of bronze is sintered onto the backing metal, such as steel or a copper or aluminum alloy for example, in such a way that it has a pore volume of from 20–45% and the bronze is composed of from 5–15% tin and optionally additionally 5–15% lead. The plastics mixture is then applied by rolling onto the porous backing in such a way that the pores are completely filled in and, depending on the application, a 0–50 μm covering layer arises. Thereafter, the material is subjected to heat treatment in a furnace, wherein the PTFE obtained is sintered for 3 mins at 380° C. to produce the final composite material and the necessary final dimensions in a final rolling stage.

Production of the plastics mixture may be effected by means of a PTFE dispersion, which is added to the fillers in such a way that they are entrained in homogeneous dispersion when subsequent coagulation is carried out. A pasty composition

BRIEF DESCRIPTION OF THE DRAWING

The above and other objects, features, and advantages will become more readily apparent from the following description, reference being made to the accompanying drawing in which.

In the drawings.

SPECIFIC DESCRIPTION AND EXAMPLES

Example 1

9 l water, 20 g sodium lauryl sulphate, 13.4 kg PbO, 0.85 kg $CaF_2$ and 21.6 kg of a 40% PTFE dispersion are stirred energetically for 20 mins. 500 g of a 20% aluminum nitrate solution are then added. After the completion of coagulation, the consistency necessary for processing is produced by stirring 1 l of toluene into the mixture for 10 mins.

TABLE 1

| Ex. No. | Composition, vol. % | Wear [μm/h] | Friction coefficient |
|---|---|---|---|
| 0 | 80 PTFE, 20 Pb (comparison material, prior art) | 120 | 0.20 |
| 1 | 70 PTFE, 25.5 PbO, 4.5 $CaF_2$ | 29 | 0.17 |
| 2 | 70 PTFE, 30 PbO | 40 | 0.17 |
| 3 | 65 PTFE, 26.2 PbO, 8.8 $CaF_2$ | 26 | 0.16 |
| 4 | 65 PTFE, 35 PbO | 38 | 0.15 |
| 5 | 60 PTFE, 35 PbO, 5 $CaF_2$ | 20 | 0.15 |
| 6 | 60 PTFE, 40 PbO | 35 | 0.17 |

TABLE 2

| Ex. No. | Composition, vol. % | Wear [μm/h] | Friction coefficient |
|---|---|---|---|
| 5 (for comparison) | 60 PTFE, 35 PbO, 5 $CaF_2$ | 20 | 0.15 |
| 7 | 60 PTFE, 31.5 PbO, 4.5 $CaF_2$, 4 $Si_2N_4$ | 15 | 0.17 |
| 8 | 60 PTFE, 29.8 PbO, 4.2 $CaF_2$, 6 C fibers | 13 | 0.18 |
| 9 | 60 PTFE, 33.3 PbO, 4.7 $CaF_2$, 2 $Fe_2O_3$ | 18 | 0.15 |

TABLE 2-continued

| Ex. No. | Composition, vol. % | Wear [μm/h] | Friction coefficient |
|---|---|---|---|
| 10 | 60 PTFE, 30.8 PbO, 4.4 CaF$_2$, 4.8 MoS$_2$ | 8 | 0.16 |
| 11 | 60 PTFE, 32.2 PbO, 4.6 CaF$_2$, 3.2 PAI | 26 | 0.20 |

TABLE 3

| Ex. No. | Composition, vol. % | Wear [μm/h] | Friction coefficient |
|---|---|---|---|
| 3 (for comparison) | 65 PTFE, 26.2 PbO, 8.8 CaF$_2$ | 26 | 0.16 |
| 12 | 65 PTFE, 26.2 PbO, 8.8 MgF$_2$, | 30 | 0.17 |
| 13 | 65 PTFE, 26.2 PbO, 8.8 PbF$_2$, | 28 | 0.15 |
| 14 | 80 PEEK, 20 PTFE | 36 | 0.20 |
| 15 | 80 PEEK, 12.5 PTFE, 7.5 PbO | 16 | 0.15 |
| 16 | 80 PEEK, 12 PTFE, 7.2 PbO, 0.8 CaF$_2$ | 10 | 0.17 |

It has been shown that the compositions according to the invention are markedly superior to the standard materials based on PTFE/MoS$_2$ or PTFE/Pb as far as both the friction coefficient and wear resistance are concerned and even surpass the compositions of PTFE and PbO which are better than these sliding materials.

Figure 4:
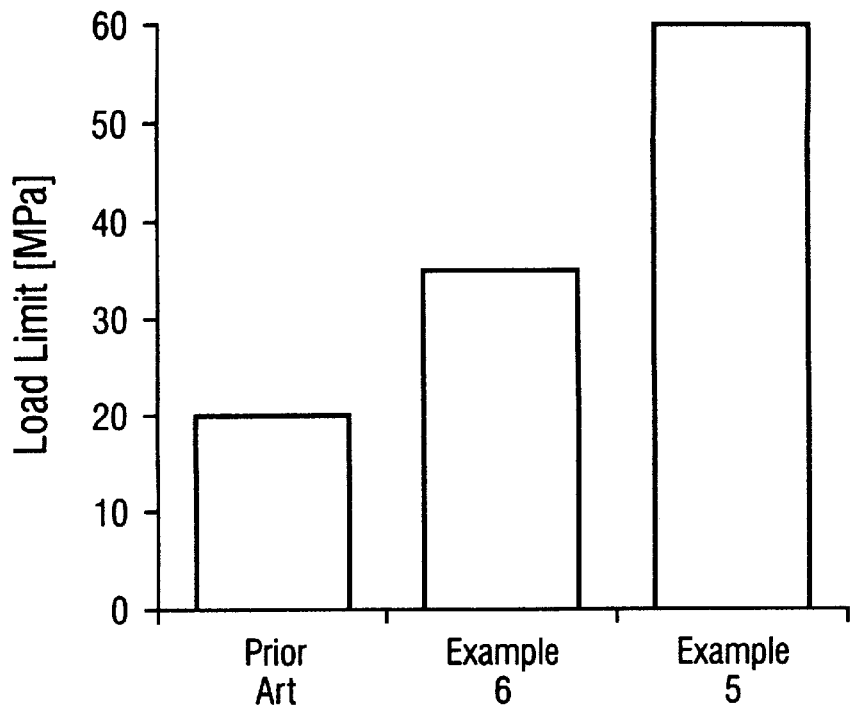

The PTFE, PbO and CaF$_2$ composition was varied over a large range and samples of the above-described three-layer materials were produced comprising 1.25 mm steel, 0.23 mm bronze and a 0.02 mm plastic covering layer. These samples were measured by means of a pin/roller tribometer, using test pieces of 0.78 cm$^2$, with respect to rates of wear at a circumferential speed of 0.52 m/sec and a load of 17.5 MPa and compared with a standard material. The standard material used was a composite material with a plastics layer of 80 vol. % PTFE and 20 vol. % lead, which is cited as Example No. 0 in Table 1 and designated in FIGS. 1, 2 and 4 as a standard or material according to the prior art.

Figure 1:
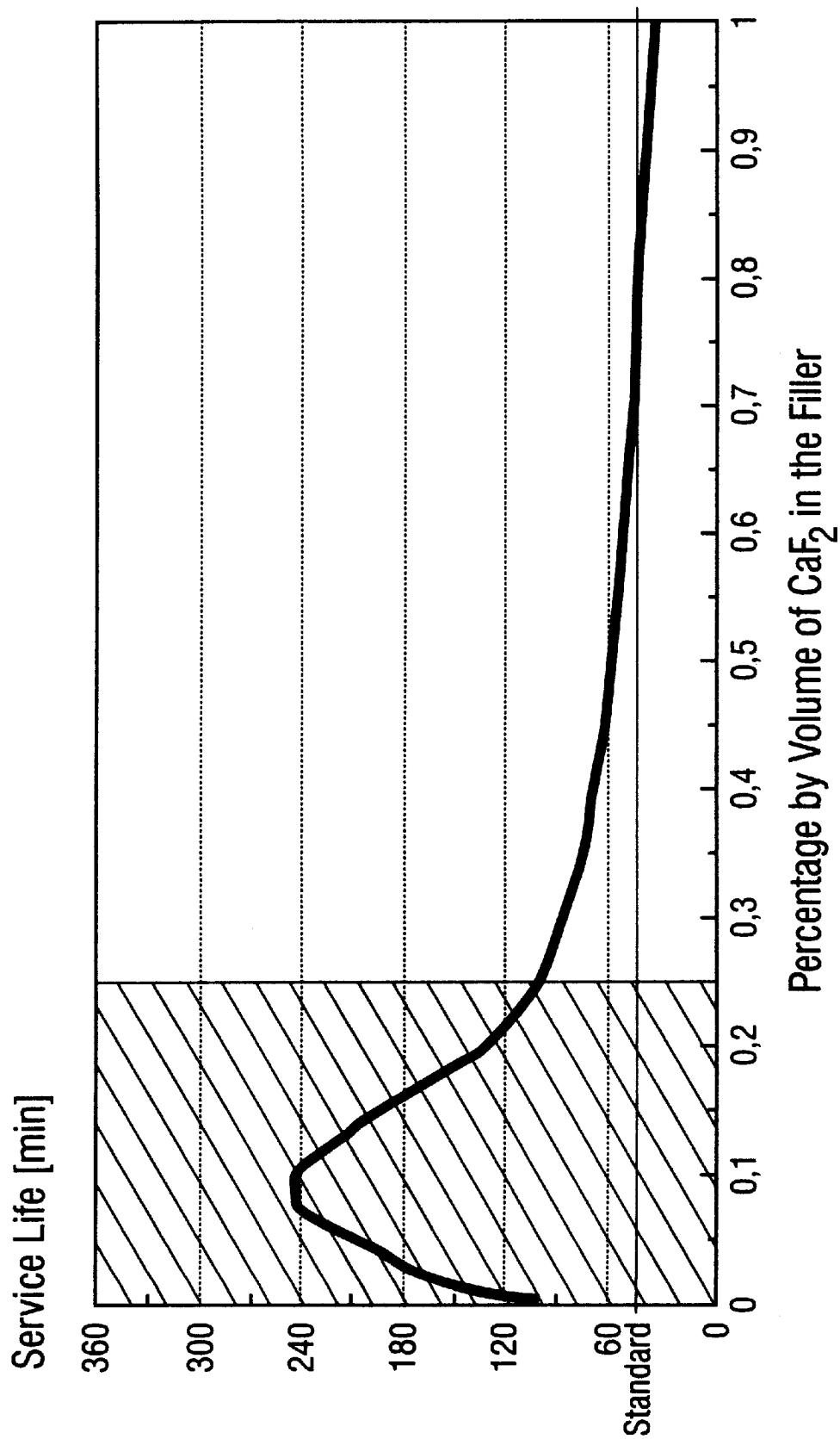
FIG. 1 is a diagram in which service life in dependence on the $CaF_2$ content is represented graphically.
Figure 2:
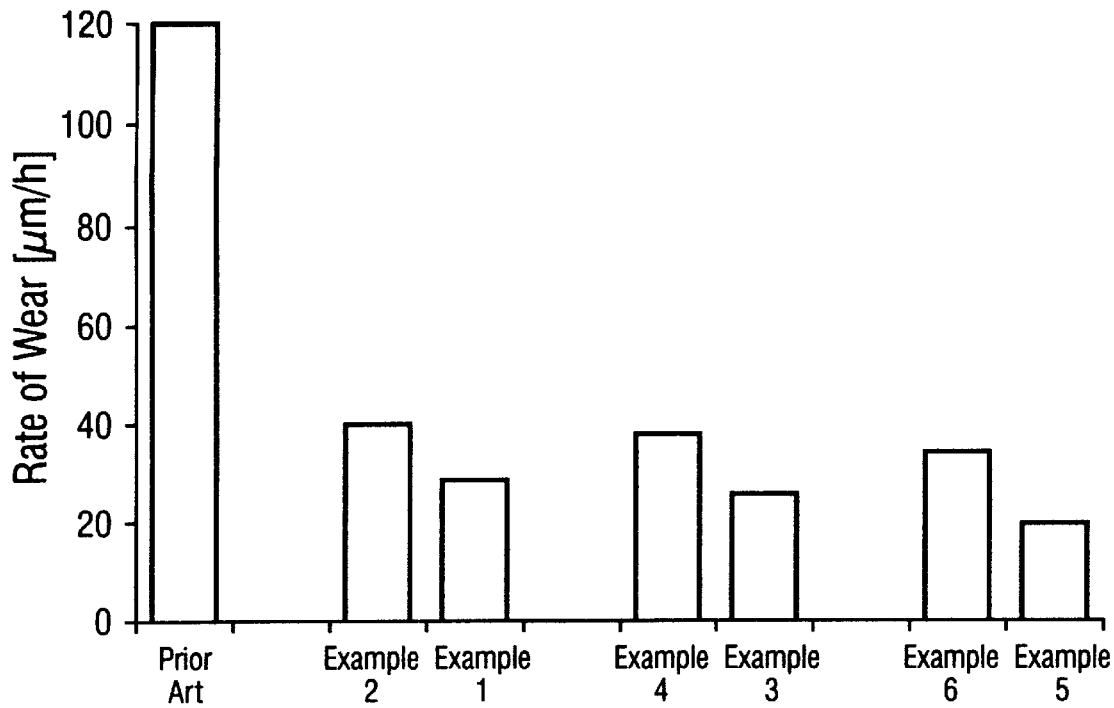
FIGS. 2 through 5 are diagrams in which the rate of wear or local limit for various compositions is represented graphically.

FIG. 1 shows the service life of a plain bearing according to the invention in dependence on the CaF$_2$ filler content, the total filler content being kept constant at 40 vol. %. It may be clearly seen that the hatched area represents a clearly pronounced maximum with respect to service life, corresponding to minimum wear. In the maximum area the service life values reached are approximately three times those which are achieved with a bearing material comprising only lead oxide in the polymer matrix. To clarify the improvements which may be obtained according to the invention, the material compositions given in Table 1 together with the friction coefficients and rates of wear from the pin/roller test were tested. In FIG. 2 the results are graphically compared. It may be clearly seen that the sliding materials with the filler combination PbO/CaF$_2$ does better in all cases than a sliding material comprising only PbO.

Figure 3:
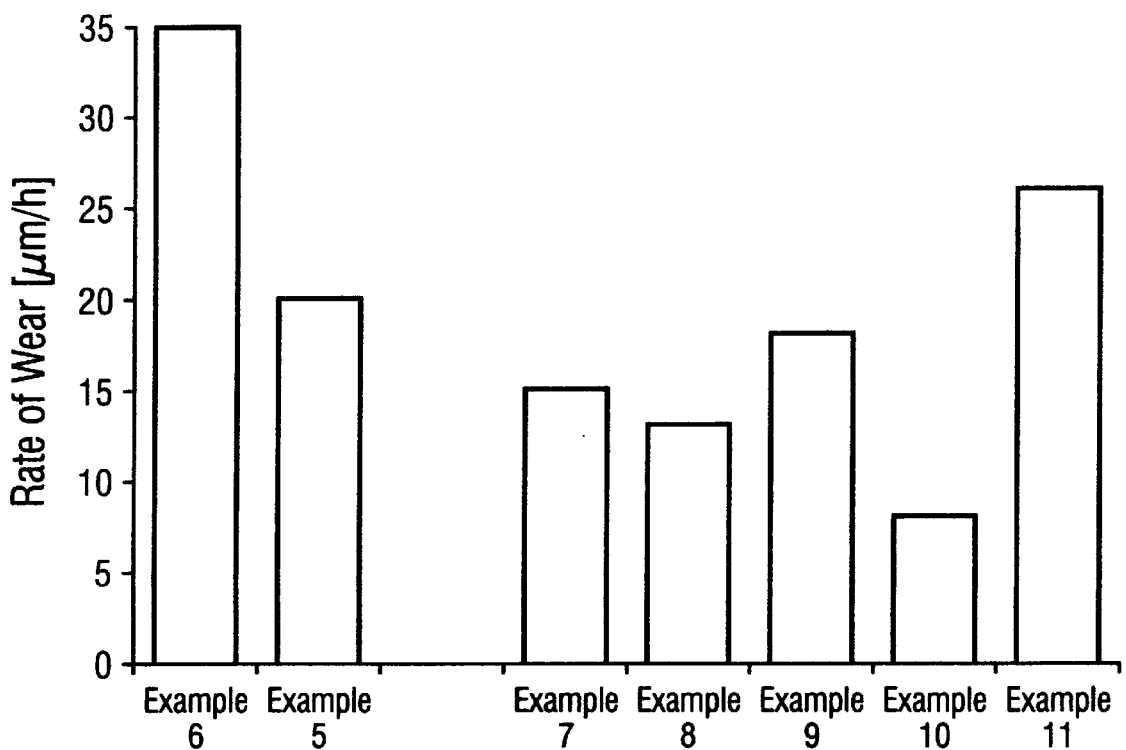

The results of Examples 7 to 11 compared in Table 2 and FIG. 3 show that the sliding materials according to the invention may also be combined with further additives without the positive properties being lost. These additives sometimes even result in marked improvements.

In Examples 12 and 13 magnesium fluoride and lead fluoride were used instead of calcium fluoride. The corresponding results, compared with a composition comprising calcium fluoride, are summarized in Table 3. It is clear that other fluorocompounds including metals from Group II of the Periodic Table or lead fluoride are also capable of achieving the effect according to the invention.

Bushings with a diameter of 22 mm were produced from the compositions according to Examples 5 and 6 and their load limits were tested in a rotating test run. The load limit was defined as the highest possible load under which a running distance of 22.5 km was achieved at a speed of 0.125 m/sec. The failure criterion was a considerable increase in friction coefficient and temperature, which proved in a subsequent investigation to be synonymous with an average wear depth of 90 μm. The result of Example 5 corresponds, when evaluated in a different way, to a pv value of 6 MPa.m/sec. The corresponding results are represented graphically in FIG. 4.

Figure 5:
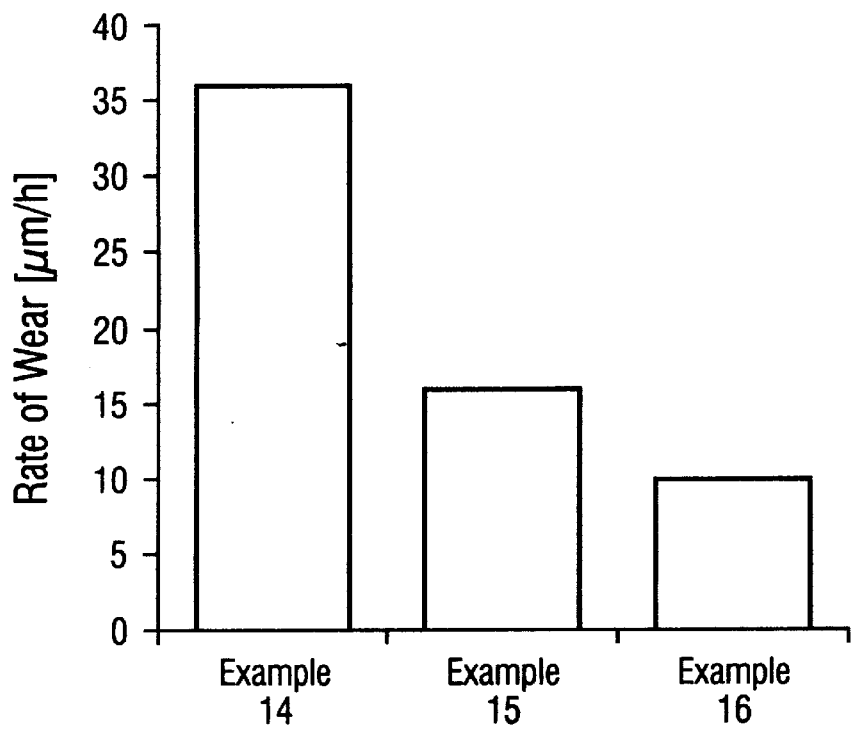

Another possible way of advantageously carrying out the invention consists in working the mixtures according to the invention, including PTFE, into a thermoplastics matrix and then processing the latter in any desired manner to form a sliding element, e.g. applying it to a metal backing with or without a bronze intermediate layer or producing solid plastics parts. The thermoplastics content may vary between 60 and 95 vol. %. Examples 2 to 13 were produced in the same way. In Examples 14 to 16 PEEK and PTFE were used instead of the matrix material PTFE and the samples were produced by powder mixing. The mixtures may also be produced by extrusion compounding. To clarify the effect according to the invention, Table 4 and FIG. 5 show the friction and wear coefficients of PEEK compounds with PTFE, PTFE/PbO and PTFE/PbO/CaF$_2$. It may be seen that the CaF$_2$ here also supports the wear-reducing effect of the lead oxide.

We claim:

1. A self-lubricating bearing material of a PTFE-containing polymer matrix with fillers comprising PbO and calcium fluoride, wherein the PbO content amounts to from 15 to 55 vol. % and the calcium fluoride content amounts to from 0.1 to 14 vol. %.

2. A bearing material as claimed in claim 1, wherein, in addition to PTFE, the polymer matrix also comprises PEEK, PPS, PA, PVDF, PSU, PES or PEI individually or in combination.

3. A bearing material as claimed in claim 1, wherein the polymer matrix consists of PTFE and the fillers consist of from 15 to 55 vol. % PbO and 0.1 to 14 vol. % CaF$_2$.

4. A bearing material as claimed in claim 3, wherein the polymer matrix consists of PTFE and the fillers consist of from 20 to 40 vol. % PbO and 0.3 to 8 vol. % CaF$_2$.

5. A bearing material as claimed in claim 1, wherein the fillers include hard materials, pigments, fibrous materials, solid lubricants or thermoset or high temperature thermoplastic materials.

6. A bearing material as claimed in claim 5, wherein the hard materials are Si$_3$N$_4$.

7. A bearing material as claimed in claim 5, wherein the pigments are Fe$_2$O$_3$ or carbon black.

8. A bearing material as claimed in claim 5, wherein the fibrous material is short graphite fibers or aramid fibers.

9. A bearing material as claimed in claim 5, wherein the solid lubricants are MoS$_2$ or boron nitride.

10. A bearing material as claimed in claim 5, wherein the thermoset or high temperature thermoplastic materials are polyamide imides or polyimides.

11. A plain bearing with a self-lubricating plastic overlay, wherein the plastic overlay is metallic-lead free and comprises PTFE-containing polymer matrix and from 15 to 55 vol. % PbO and 0.1 to 14 vol. % calcium fluoride as fillers.

12. A plain bearing as claimed in claim 11, wherein the overlay is applied directly to a metal backing.

13. A plain bearing as claimed in claim 11, wherein the overlay is applied to a metal backing provided with a layer of porous sintered bronze.

14. A plain bearing as claimed in claim 13, wherein the sintered bronze has a pore volume of from 20 to 45%.

15. A plain bearing as claimed in claim 13, wherein the sintered bronze comprises from 5 to 15% tin.

16. A plain bearing as claimed in claim 13, wherein the sintered bronze comprises from 5 to 15% tin and from 5 to 15% lead.

* * * * *